E. HIGGINS.
SHAFT COUPLING.
APPLICATION FILED JULY 9, 1921.
1,413,117.
Patented Apr. 18, 1922.
2 SHEETS—SHEET 1.
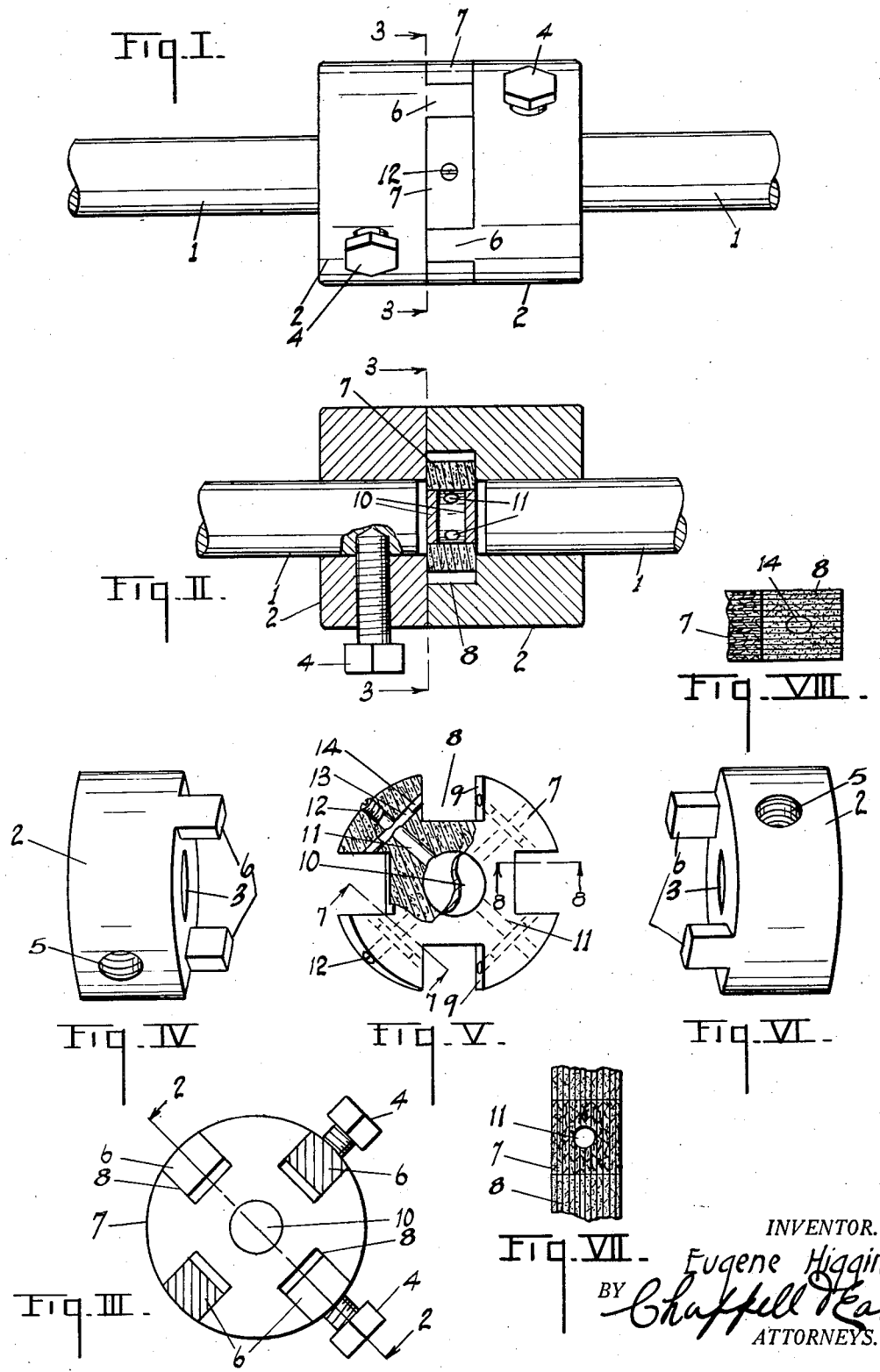
INVENTOR.
Eugene Higgins
BY
ATTORNEYS.

E. HIGGINS.
SHAFT COUPLING.
APPLICATION FILED JULY 9, 1921.
1,413,117.
Patented Apr. 18, 1922.
2 SHEETS—SHEET 2.
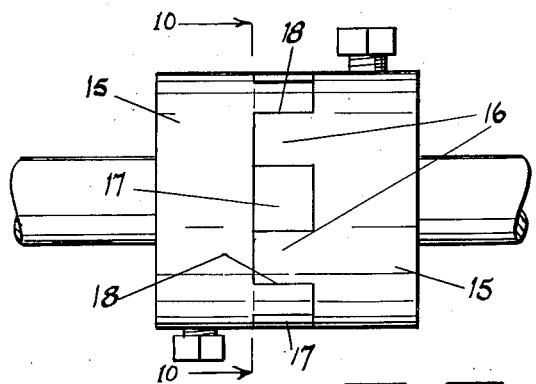
Fig. IX.
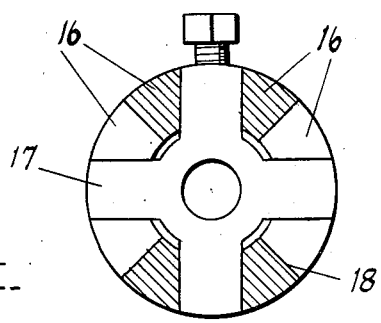
Fig. X.
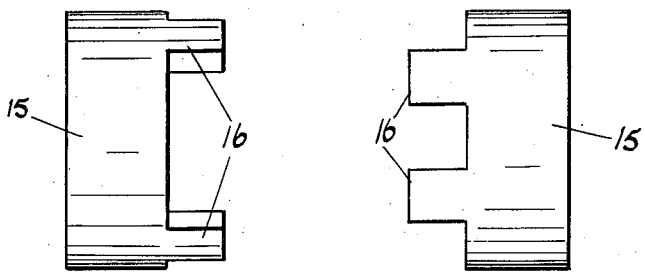
Fig. XI.
INVENTOR.
Eugene Higgins
BY *Chappell & Earl*
ATTORNEYS.

UNITED STATES PATENT OFFICE.

EUGENE HIGGINS, OF JACKSON, MICHIGAN.

SHAFT COUPLING.

1,413,117.  Specification of Letters Patent.  Patented Apr. 18, 1922.

Application filed July 9, 1921. Serial No. 483,507.

*To all whom it may concern:*

Be it known that I, EUGENE HIGGINS, a citizen of the United States, residing at the city and county of Jackson, State of Michigan, have invented certain new and useful Improvements in Shaft Couplings, of which the following is a specification.

This invention relates to improvements in shaft couplings.

The main objects of this invention are:

First, to provide an improved shaft coupling in which the parts are simple and economical in structure and very durable in use.

Second, to provide in a shaft coupling an improved lubricating means.

Further objects, and objects relating to structural details, will definitely appear from the detailed description to follow.

I accomplish the objects of my invention by the devices and means described in the following specification. The invention is clearly defined and pointed out in the claims.

A structure which is a preferred embodiment of my invention is clearly illustrated in the accompanying drawing, forming a part of this application, in which:

Fig. I is a side view of my improved shaft coupling, the shaft sections being partially broken away.

Fig. II is a detail view mainly in longitudinal section on a line corresponding to line 2—2 of Fig. III.

Fig. III is a transverse section on a line corresponding to line 3—3 of Figs. I and II.

Fig. IV is a side perspective view of one of the shaft members.

Fig. V is a perspective view of the coupling member, partially in section, showing the structural details thereof.

Fig. VI is a side perspective view of the second coupling member.

Fig. VII is a detail section of the coupling member on a line corresponding to line 7—7 of Fig. V.

Fig. VIII is a detail section of the coupling member on a line corresponding to line 8—8 of Fig. V.

Fig. IX is a side view of a modified form of my improved coupling.

Fig. X is a transverse section on a line corresponding to line 10—10 of Fig. IX.

Fig. XI is a side view of the coupling members separated.

In the drawing, similar reference characters refer to similar parts throughout the several views, and the sectional views are taken looking in the direction of the little arrows at the ends of the section lines.

Referring to the drawing, 1 represents the shaft sections to be coupled. The shaft members 2 are duplicates, the same having central bores 3 adapted to receive the ends of the shaft, and being secured to the shaft by the set screws 4 engaged in the radial holes 5.

Each shaft member is provided with a pair of driving lugs 6, the planes of the driving lugs being at right angles when the shaft members are in assembled relation.

The cruciform coupling member 7 has slot-like bearing openings 8 coacting with the lugs 6, the sides of the lugs being in bearing engagement with the bearing surfaces 9, the bearing surfaces 9 of the coupling member coacting with the lugs and the bearing openings being of such depth as to permit free movement of the driving lugs therein, as is shown in Fig. III.

The coupling member 5 is preferably formed of a material known as "Textoil" which has a body of layers of canvas impregnated and bound together in a solid body with "Bakelite". This reduces noise and, when lubricated, as I provide for, has great durability.

I provide the coupling member with a central lubricating member 10 having radial passages 11 communicating therewith and enclosed at their outer ends by the screws 12. Any of these screws may be removed to permit the filling of the reservoir.

Transverse passages 13 communicate with these radial passages and open into the bearing surfaces 9 of the coupling member. The ends of the passages 13 are closed by short plugs 14, preferably of wood, which permit gradual seepage of the lubricant through the drain plugs, thus supplying the bearing surfaces with a thin film of the lubricant and at the same time the feed is slow so that the lubricant is not wasted and the relatively small chamber is all that is required. When formed of "Textoil" or suitable fibrous material, the bearing surfaces effectively retain the lubricant and also the noise is minimized.

In the modification shown in Figs. IX, X and XI, the coupling members 15 are provided with pairs of jaws 16 disposed to receive one arm of the cruciform coupling member 17 between them. The jaws of each coupling member are also in bearing relation or engagement with the jaws of the other coupling member at 18.

With this arrangement, the coupling member is relieved of considerable of the driving strain.

My improved coupling is very economical and is durable in use and, in the embodiment illustrated in Figs. I–VIII, inclusive, efficiently lubricated and, when the fibrous material is employed for the coupling member, it is substantially noiseless.

Having thus described my invention, what I claim as new and desire to secure by Letters Patent, is:

1. A shaft coupling comprising a pair of shaft members each having driving lugs, and a cruciform coupling member coacting with the lugs of both shaft members, said coupling member being formed of "Textoil", and having a central oil reservoir and radial passages extending to the ends of the arms thereof and feed passages extending transversely of said arms and communicating with said radial passages and opening into the bearing faces thereof, said radial passages being provided with screw closures, and said feed passages being closed by plugs permitting the gradual escape of the lubricant therethrough to the bearing surfaces.

2. A shaft coupling comprising a pair of shaft members each having driving lugs, and a cruciform coupling member coacting with the lugs of both shaft members, and having a central oil reservoir and radial passages extending to the ends of the arms thereof and feed passages extending transversely of said arms and communicating with said radial passages and opening into the bearing faces thereof, said radial passages being provided with screw closures, and said feed passages permitting the gradual escape of the lubricant to the bearing surfaces.

3. A shaft coupling comprising a pair of shaft members each having driving lugs, a cruciform coupling member coacting with the lugs of both shaft members, said coupling member being formed of "Textoil", and a lubricating chamber within said coupling member provided with feed conduits permitting the gradual feeding of the lubricant to the bearing surfaces.

4. A shaft coupling comprising a pair of shaft members each having driving lugs, a cruciform coupling member coacting with the lugs of both shaft members, said coupling member being formed of "Textoil," and a lubricant chamber within said coupling member for supplying lubricant to the bearing surfaces thereof.

5. A shaft coupling comprising a pair of shaft members each having driving lugs, and a cruciform coupling member coacting with the lugs of both shaft members, said coupling member being formed of fibrous material, and having a central oil reservoir and feed passages opening into the bearing surfaces thereof, said feed passages being closed by plugs permitting the gradual escape of the lubricant therethrough to the bearing surfaces.

6. A shaft coupling comprising a pair of shaft members each having driving lugs, a coupling member having slot-like bearing openings for said driving lugs, said coupling member being provided with a lubricant chamber and with feed passages opening into the bearing faces thereof, the ends of said feed passages being closed by means permitting the gradual seepage of the lubricant to the bearing surfaces.

7. A shaft coupling comprising a pair of shaft members each having driving lugs, a coupling member having slot-like bearing openings for said driving lugs, said coupling member being provided with a lubricant chamber and with feed passages opening into the bearing faces thereof.

8. A shaft coupling comprising a pair of shaft members each having driving lugs, a cruciform coupling member coacting with the lugs of both shaft members, said coupling member being formed of fibrous material, and a lubricant chamber within said coupling member for supplying lubricant to the bearing surfaces thereof.

9. A shaft coupling comprising a pair of shaft members each having driving lugs, a cruciform coupling member coacting with the lugs of both shaft members, and a lubricant chamber within said coupling member for supplying lubricant to the bearing surfaces thereof.

In witness whereof, I have hereunto set my hand and seal in the presence of two witnesses.

EUGENE HIGGINS. [L. S.]

Witnesses:
MARCIA HIGGINS,
ALLEN CRAWFORD, Jr.